United States Patent [19]

Kawamoto et al.

[11] Patent Number: 4,706,976
[45] Date of Patent: Nov. 17, 1987

[54] FRONT AND REAR WHEEL STEERING DEVICE

[75] Inventors: Yoshimichi Kawamoto; Yoshimi Furukawa; Tetsuro Hamada; Mitsuya Serizawa, all of Tochigi, Japan

[73] Assignee: Honda Giken Kogyo Kabushiki Kaisha, Tokyo, Japan

[21] Appl. No.: 822,010

[22] Filed: Jan. 24, 1986

[30] Foreign Application Priority Data

Jan. 24, 1985 [JP] Japan ................................ 60-011836

[51] Int. Cl.$^4$ ................................................ B62D 6/02
[52] U.S. Cl. .................................... 280/91; 364/425
[58] Field of Search .......................... 280/91, 96, 99; 180/170, 172, 140, 141, 142, 143, 336; 74/571 L, 831, 834, 836; 364/424, 425

[56] References Cited

U.S. PATENT DOCUMENTS 4,441,572 4/1984 Ito et al. ............................... 180/140

Primary Examiner—John J. Love
Assistant Examiner—Karin L. Ferriter
Attorney, Agent, or Firm—Lyon & Lyon

[57] ABSTRACT

In a front and rear wheel steering device for a vehicle in which the steering angle ratio of the rear wheels relative to the front wheels is variable according to the vehicle speed, by accounting for the magnitude of vehicle acceleration in determining the steering angle ratio of the rear wheels by using a mathematical function in the form of f(u) - g(u')where u is a vehicle speed and u' is a change rate of the vehicle speed, it is possible to reduce the slip angle of the vehicle to zero irrespective of the vehicle speed and the vehicle acceleration and the phase delay of the lateral response of the vehicle can be reduced, whereby the driveability of the vehicle is substantially improved and, thus, driving a car can be made easier, safer and less tiring.

5 Claims, 7 Drawing Figures

FRONT AND REAR WHEEL STEERING DEVICE

FIELD OF THE INVENTION

This invention relates to an improvement of a front and rear wheel steering device for a vehicle which can variably control the steering angle of the rear wheels in relation with the steering angle of the front wheels.

DESCRIPTION OF THE PRIOR ART

There have been a number of proposals to provide front and rear wheel steering devices particularly in the form of four wheel steering devices. For instance, Japanese patent application Ser. No. 53-163678 (Japanese patent Laying-Open Publication No. 55-91457), filed by the Assignee of the present application, proposes a front and rear wheel steering device for a vehicle which steers the rear wheels in relation with the steering of the front wheels in the same phase relationship in high speed range and in the opposite phase relationship in low speed range. The steering angle ratio is a continuous function relative to the vehicle speed, for instance, as indicated by the line "Q" FIG. 5.

Thus, a continuous control of the steering angle ratio is performed according to this continuous function Q so that the function of the steering device may be favorable in both speed and low speed ranges. Specifically, the minimum angle of turning and the inner radius difference of the vehicle are both drastically reduced and the maneuverability of the vehicle, particularly in low speed range, in driving the vehicle into a garage, driving the car through narrow and crooked alleys and making a U-turn are substantially improved with the additional advantage of improving the dynamic lateral response of the vehicle in high speed range.

In particular, by controlling the steering angle ratio of the rear wheels according to the mathematical function $f(u)=(A-Bu^2)/(C-Du^2)$ as proposed in Japanese patent application Ser. No. 55-84519 (Japanese patent Laying-Open Publication No. 57-11173), and U.S. Pat. No. 4,441,572 owned by the same Assignee. It is theoretically possible to reduce the slip angle of the vehicle to zero and the vehicle is allowed to run along the tangent of a circle defined around the center of turning whereby the burden on the driver in controlling the motion of the vehicle can be effectively reduced. And, also, that the phase delay of the response of the vehicle to lateral acceleration is thereby reduced contributes to the improvement of the driving response of the vehicle.

However, the above-mentioned mathematical function is derived upon assumption that the vehicle is undergoing a steady turn or turning at a constant radius at a constant speed, but, in reality, the vehicle often turns while accelerating or decelerating. This is because, while the driver, in driving a curved road at a relatively high speed, normally predicts the curvature of the next curve and enters the curve after adjusting the vehicle speed to the curvature of the next curve, in many cases, the driver is required to readjust the vehicle speed after entering the curve.

According to experiments conducted by the Inventors, it was found that, when the steering angle ratio is controlled so as to reduce the slip angle to zero with the assumption that the vehicle speed is constant, a desired result is not necessarily obtained. Specifically, the vehicle tends to cut inside the curve when the vehicle is decelerating and the trajectory of the vehicle tends to swerve to the outside of the curve when vehicle is accelerating. Further, it was found that the driving response of the vehicle can be drastically improved if the acceleration of the vehicle or the change rate of the vehicle speed is taken into account.

SUMMARY OF THE INVENTION

In view of such problems, a primary object of this invention is to provide a front and rear wheel steering device for a vehicle according to which the driving response of the vehicle is improved and the driving of the vehicle is made more comfortable and safer by appropriately determining the property of the steering angle ratio function in the front and rear wheel steering device for vehicle according to the acceleration of the vehicle.

According to the present invention, such an object is accomplished by providing a front and rear wheel steering device for a vehicle for variably controlling the steering angle ratio of rear wheels relative to front wheels according to vehicle speed, comprising: a control means for controlling the steering angle ratio of the rear wheels as a mathematical function of vehicle speed u; the mathematical function being expressed as $f(u)=g(u')$ where $u'$ is a change rate of the vehicle speed and $g(u')$ is a monotonously increasing function of $u'$.

Thus, by taking into account not only the vehicle speed but also the change rate of the vehicle speed in determining the steering angle ratio of the rear wheels in a front and rear wheel steering device, the driving response of the vehicle can be drastically improved.

According to a certain aspect of the present invention, the function $f(u)$ is selected as $f(u)=(A-Bu^2)/(C-Du^2)$ where A, B, C and D are constants depending on the specifications of the vehicle, as described below.

Thereby, the slip angle of the vehicle can be reduced to zero irrespective of the magnitude of the acceleration of the vehicle. Further, the function $g(u')$ may be selected with desired accuracy so that the desired vehicle response may be obtained without unduly complicating the control structure. For instance, if $g(u')=Ku'$ where K is a certain constant, the control structure will be extremely simplified yet sufficient improvement in the vehicle response in acceleration and deceleration will be obtained.

BRIEF DESCRIPTION OF THE DRAWINGS

Such and other objects and advantages of the present invention will be better understood with reference to the following description and the appended drawings in which.

DETAILED DESCRIPTION OF THE PREFERRED EMBODIMENT

Now an embodiment of this invention is described in the following with reference to the appended drawings.

Figure 1:
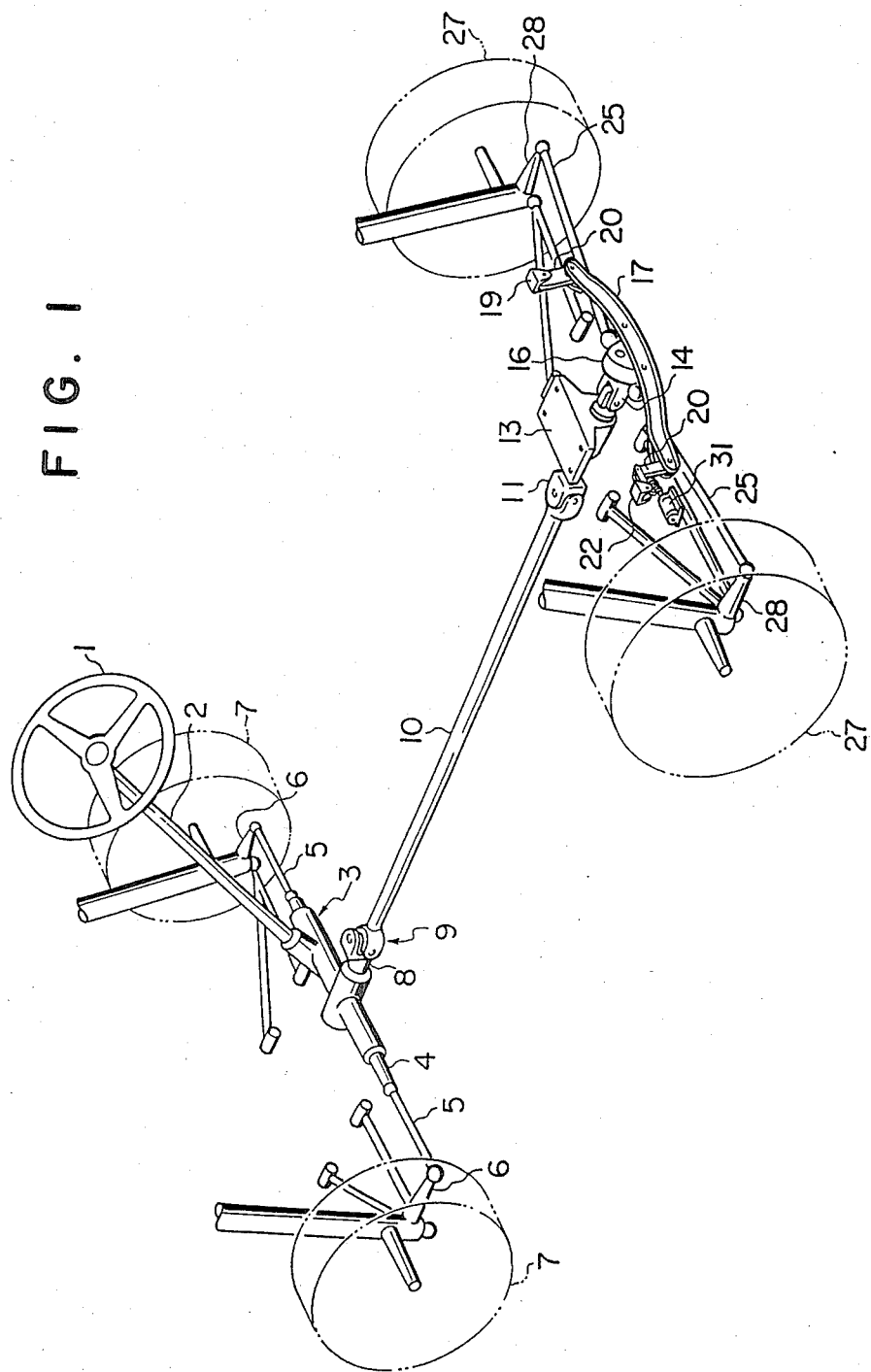
FIG. 1 is a perspective view showing the general basic structure of a vehicle provided with a front and rear wheel steering device according to this invention with the chassis of the vehicle removed.

As shown in FIG. 1, a steering column shaft 2 of a steering wheel 1 is joined into a rack and pinion type gear box 3, and a pair of tie rods 5 are connected to the two ends of a rack shaft 4 which meshes with a pinion gear (not shown in the drawings) integrally attached to the lower end of the steering column shaft 2. To the external ends of the tie rods 5 are connected a pair of knuckle arms 6 which support right and left front wheels 7, respectively, in such a manner that the front wheels 7 can be steered to the direction determined by the steering wheel 1 in the known manner.

A pinion shaft 8 extends from the gear box 3 in the rearward direction and an elongated linkage shaft 10 is connected to the rear end of the pinion shaft 8 by way of a universal joint 9. The pinion shaft 8 is provided with a pinion gear (which is not shown in the drawings) which meshes with the rack shaft 4. And an input shaft 12 (FIG. 2) is connected to the rear end of the linkage shaft 10 by way of another universal joint 11. This input shaft 12 is disposed along the laterally central line of the rear part of the vehicle and is rotatably supported by a bearing bracket 13 as best shown in FIG. 2.

Figure 2:
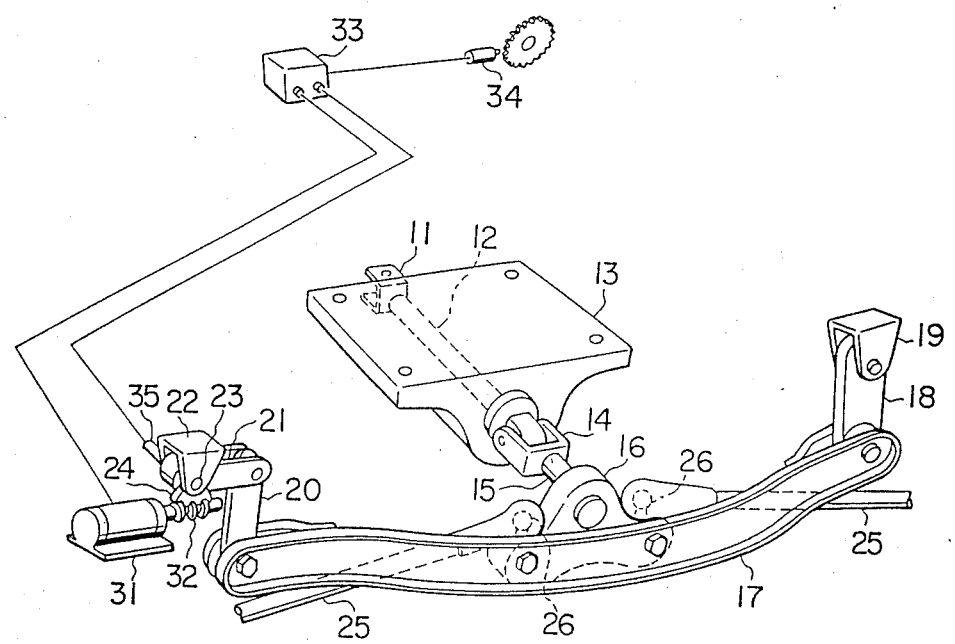
FIG. 2 is a enlarged perspective view of the rear wheel steering system of the embodiment of FIG. 1.

Further, a swing shaft 15, which is shown in greater detail in FIG. 2, is connected to the rear end of the input shaft 12 by way of a clevis 14, and a joint member 16 is loosely fitted over a middle portion of the swing shaft 15. The two lateral ends of the joint member 16 are connected to tie rods 25 by way of ball joints 26 respectively, and the joint member 16 is fixedly supported by a middle part of an arm member 17 which is arranged along the widthwise direction of the vehicle.

One end of the arm member 17 is connected to the vehicle body by way of a link member 18 and a link bracket 19 while the other end of the arm member 17 is connected to the vehicle body by way of link members 20 and 21 and a link bracket 22 in such a manner that the arm member 17 is about to swing in a vertical plane which is perpendicular to the longitudinal direction of the vehicle. A pivot shaft 23 of the link member 21 on the side of the bracket 22 is fixed and rotates integrally with the link member 21. The external ends of the tie rods 25 are connected to knuckle arms 28 which support rear wheels 27 as shown in FIG. 1.

A motor 31 is mounted in a part of the vehicle body located on the side of the other end of the arm. member 17 and an output shaft of the motor 31 is fixedly provided with a worm gear 32 which in turn meshes with a sector gear 24 integrally mounted on the pivot shaft 23 of the link member 21. Thus, the rotation of the motor 31 will cause the rotational motion of the link member 21 to swing the arm member 17 upwardly or downwardly through the link member 20. Further, the vehicle is provided with a computer 33 which receives signals from a vehicle speed sensor 34 for detecting the vehicle speed and a position sensor 35 which detects the position of the pivot shaft 23 of the link member 21 and sends an appropriate control signal to the computer 33 according to the vehicle speed to control the rotation of the motor 31.

Figure 3A:
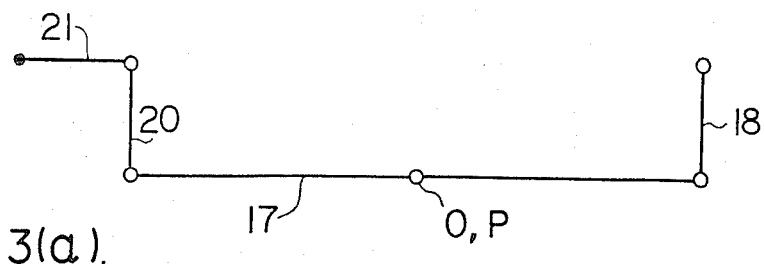
FIGS. 3(a), 3(b) and 3(c) are diagrammatic rear views of the rear wheel steering system of FIG. 2, illustrating the working principle thereof.

When the pivot point P of the joint member 16 coincides with the center O of the input shaft 12 as shown in FIG. 3 (a), the input shaft 12 and the swing shaft 15 rotate in a coaxial manner, and therefore the joint member 16 will not laterally swing and the tie rods 25 remain stationary so that only the front wheels 7 are steered and the rear wheels 27 are not steered at all, in the same manner as in a conventional vehicle.

Figure 3B:
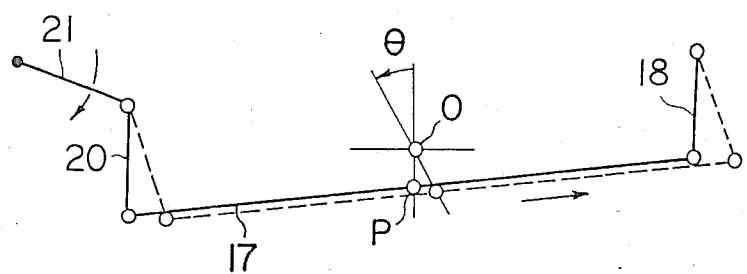
Figure 3C:
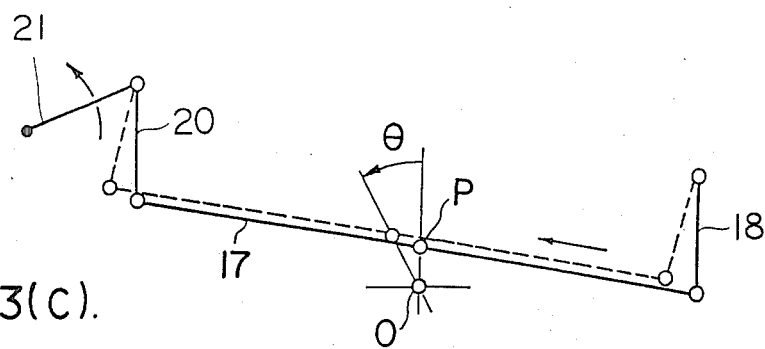

When the link member 21 is downwardly rotated by the rotation of the motor 31 by way of the worm gear 32 and the sector gear 24 meshing therewith, the arm member 17 inclines with its left end down as shown in FIG. 3 (b). Due to this inclination of the arm member 17, the pivot point P is located below the axial center O and, if the input shaft 12 is rotated for instance in the counter-clockwise direction by an angle thet a (indicated as "$\theta$" in FIGS. 3(b) and 3(c)), then the arm member 17 and the tie rods 25 move rightwardly as indicated by broken lines in FIG. 3 (b), to steer the rear wheels 27 in the direction opposite to the steering direction of the front wheels 7.

When the link member 21 is upwardly rotated by reverse rotation of the motor 31, the arm member 17 inclines with its left end up as shown in FIG. 3 (c). Due to this inclination of the arm member 17, the pivot point P is located above the axial center O and, if the input shaft 12 is rotated for instance likewise in counter-clockwise direction by angle theta, the arm member 17 and the tie rods 25 move leftward, as opposed to the previous case, as indicated by broken lines in FIG. 3 (c), to steer the rear wheels 27 in the same direction as the front wheels 7.

Now the control action of the above-described embodiment will be described in the following with reference to FIGS. 4 and 5.

Figure 4:
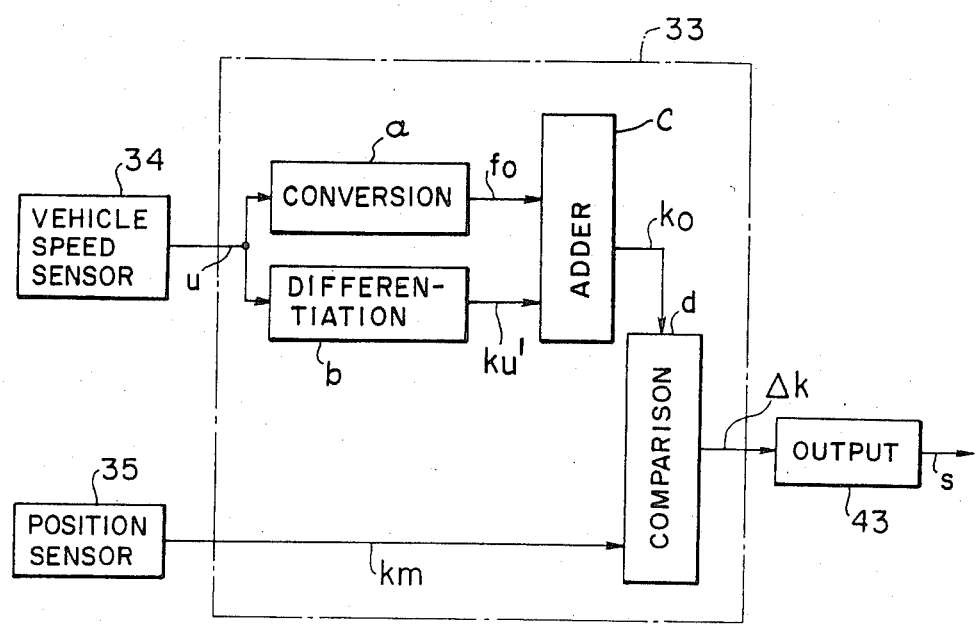
FIG. 4 is a block diagram of the control system for the embodiment of FIGS. 1 to 3.

FIG. 4 shows the functional structure of the computer 33. The vehicle speed signal detected by the vehicle speed sensor 34 is supplied to the computer 33 as a certain vehicle speed signal u. This vehicle speed signal u is converted into a predetermined steering angle ratio signal $k_O(=f(u))$ by a conversion process (a). The vehicle speed signal is converted into the change rate of the vehicle speed or the acceleration u' of the vehicle in a differentiation process (b) and, after being multiplied by a suitable constant K, is added to the function signal $f_O$ in an adder (c) to obtain a steering angle ratio signal $k_O$. If the function is given as $f(u)=(A-Bu^2)/(C-Du^2)$ where A, B, C and D are constants depending on the specifications of the vehicle, the advantage of reducing the slip angle of the vehicle to zero irrespective of the magnitude of the vehicle acceleration can be obtained. As set forth in the aforementioned U.S. Pat. No. 4,441,572, the constants or parameters A, B, C and D may be experimentally predetermined or calculated as follows:

$$A = b \times l$$

$$B = M(a \div Cr)$$

$$C = a \times l$$

$$D = -M(b \div Cf)$$

wherein:
  a = the distance between the center axis of the front axle and the center of gravity of the vehicle.
  b = the distance between the center axis of the rear axle and the center of gravity of the vehicle.
  l = the wheel base of the vehicle (the distance between the front and rear axles).
  M = the total sprung mass of the vehicle.

Cr = the cornering power of the rear wheels.
Cf = the cornering power of the front wheels.

Further, as set forth above, the mathmatical function is expressed as $f(u) - g(u')$ where $u'$ is a change rate of vehicle speed and $g(u')$ is a monotonously increasing function, i.e. a non-decreasing function, and the control structure can be simplied by selecting the function $g(u') = Ku'$ where K is a certain constant.

The computer 33 includes conventional means for producing the described mathematical function, such as a read only memory ("ROM") with look-up tables of discrete values and ranges of the variables for developing the constants in a conventional manner. In this manner, the function $g(u')$ is developed by the computer 33 as being equal to one of a plurality of constants for each range of the value of $u'$. This plurality of constants results in $g(u')$ being a smooth function of $u'$.

The position sensor 35 detects the rotational position of the link member 21 which is proportional to the steering angle ratio in actual steering and the detected result is supplied to the computer 33 as actual steering angle ratio $k_m$. A relative difference delta $k = k_m - k_O$ is obtained by a comparison process (d). This difference delta k is supplied from the computer 33 to an output control device 43 as data corresponding to the correction of the steering angle ratio which is required to obtain the desired steering angle ratio. The output end of the output control device 43 is connected to the motor 31 and supplies thereto a control signal s corresponding to the difference delta k. Thus, the motor 31 is rotated in the direction which accomplishes the steering angle ratio corresponding to the current vehicle speed and vehicle acceleration.

Figure 5:
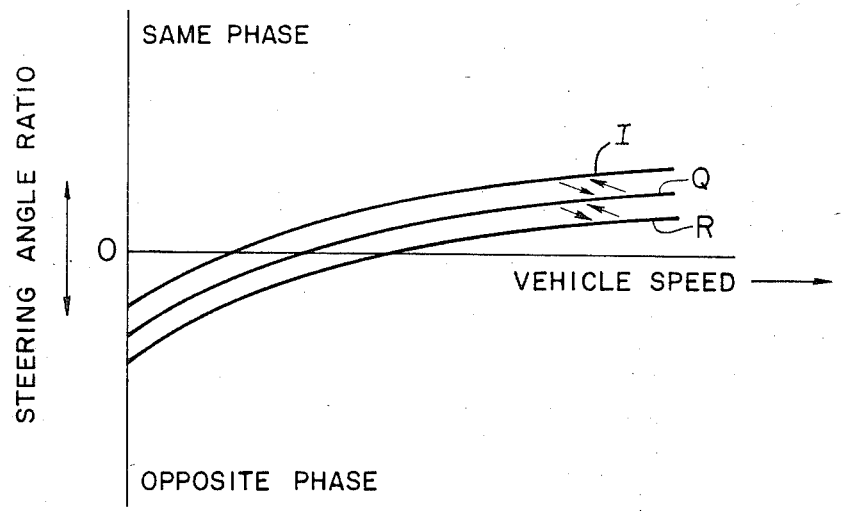
FIG. 5 is a graph illustrating the relationship between vehicle speed and rear wheel steering angle.

Thus, as shown in FIG. 5, the tendency of the vehicle to swerve to the outside of the curve when the vehicle is turning while accelerating is controlled by reducing the steering angle ratio of the rear wheels which are in the same phase relationship relative to the front wheels and the tendency of the vehicle to cut inside the curve when the vehicle is turning while decelerating is controlled by increasing the steering angle ratio of the rear wheels. In FIG. 5, curve Q represents the steering angle ratio when the change rate of the vehicle speed is zero, and curve l shows how the steering angle ratio is increased due to the deceleration of the vehicle while curve R shows how the steering angle ratio is reduced due to the acceleration of the vehicle.

Thus this invention can provide the significant advantage of producing a favorable driving response even when the vehicle is decelerating or accelerating while turning, particularly in high speed range, thereby making the driving of the vehicle more comfortable, less tiring and safer, in addition to the conveniences of a front and rear wheel steering device that the driving response is favorable in high speed range and the maneuverability of the vehicle is favorable in low speed range.

We claim:

1. A front and rear wheel steering device for a vehicle for variably controlling the steering angle ratio of rear wheels relative to front wheels according to vehicle speed, comprising:
   a control means for controlling the steering angle ratio of the rear wheels as a mathematical function of vehicle speed u;
   the mathematical function being expressed as $f(u) - g(u')$ where $u'$ is a change rate of the vehicle speed and $g(u')$ is a monotonously increasing function of $u'$.

2. A device as defined in claim 1, wherein $f(u) = (A - Bu^2)/(C - Du^2)$ where A, B, C, and D are constants depending on the specifications of the vehicle.

3. A device as defined in claim 1 or 2, wherein $g(u') = Ku'$ where K is a certain constant.

4. A device as defined in claim 1 or 2, wherein $g(u')$ is a smooth function of $u'$.

5. A device as defined in claim 1 or 2, wherein $g(u')$ is equal to one of a plurality of constants for each range of the value of $u'$.

* * * * *